US010976478B2

(12) United States Patent
Blanche et al.

(10) Patent No.: US 10,976,478 B2
(45) Date of Patent: Apr. 13, 2021

(54) ENHANCING DAYTIME DETECTION OF OBJECTS WITH THE USE OF A SYSTEM INCORPORATING DUAL DIFFRACTIVE ELEMENTS WITH CORRESPONDING DIFFRACTION EFFICIENCIES AND BANDWIDTHS

(71) Applicant: Arizona Board of Regents on Behalf of the University of Arizona, Tucson, AZ (US)

(72) Inventors: Pierre Alexandre Blanche, Tucson, AZ (US); Eric C. Pearce, Tucson, AZ (US)

(73) Assignee: Arizona Board of Regents on behalf of the University of Arizona, Tucson, AZ (US)

( * ) Notice: Subject to any disclaimer, the term of this patent is extended or adjusted under 35 U.S.C. 154(b) by 102 days.

(21) Appl. No.: 16/295,189

(22) Filed: Mar. 7, 2019

(65) Prior Publication Data

US 2019/0278011 A1 Sep. 12, 2019

Related U.S. Application Data

(60) Provisional application No. 62/716,271, filed on Aug. 8, 2018, provisional application No. 62/641,849, filed on Mar. 12, 2018.

(51) Int. Cl.
*G02B 5/32* (2006.01)
*G02B 23/00* (2006.01)
*G02B 5/18* (2006.01)
*G02B 27/42* (2006.01)

(52) U.S. Cl.
CPC ............ *G02B 5/32* (2013.01); *G02B 5/18* (2013.01); *G02B 23/00* (2013.01); *G02B 27/4227* (2013.01)

(58) Field of Classification Search
CPC .... G01J 3/2823; G01J 3/36; G01J 3/45; G01J 3/18; G01J 3/1838; G02B 23/00; G02B 26/0808; G02B 26/106; G02B 27/4205; G02B 27/4244; G02B 27/4272; G02B 5/18; G02B 5/32
USPC ............................................... 250/208.1, 216
See application file for complete search history.

(56) References Cited

U.S. PATENT DOCUMENTS 7,126,686 B2 * 10/2006 Tsujita .................. G01J 3/06
356/328

\* cited by examiner

*Primary Examiner* — Que Tan Le
(74) *Attorney, Agent, or Firm* — Yakov Sidorin; Quarles & Brady LLP

(57) ABSTRACT

An optical imaging system employing a device containing a sequence of first (pre-dispersor) and second (main) volume holograms configured to operate as a sequence of optical diffractive elements possessing different blazing curves. A pre-cursor hologram has a thickness smaller than the thickness of the following, disperser hologram, and a comparatively broad spectral selectivity as compared to that of the main hologram, allowing the pre-cursor to diffract light in transmission within a very large range of the angles of incidence. The use of the combination of the pre-cursor and the main holograms not only implements selective imaging of the chosen target object at every angle at which various portions of the object are seen at the optical system, but also facilitates the spectroscopic measurements of such object.

13 Claims, 11 Drawing Sheets

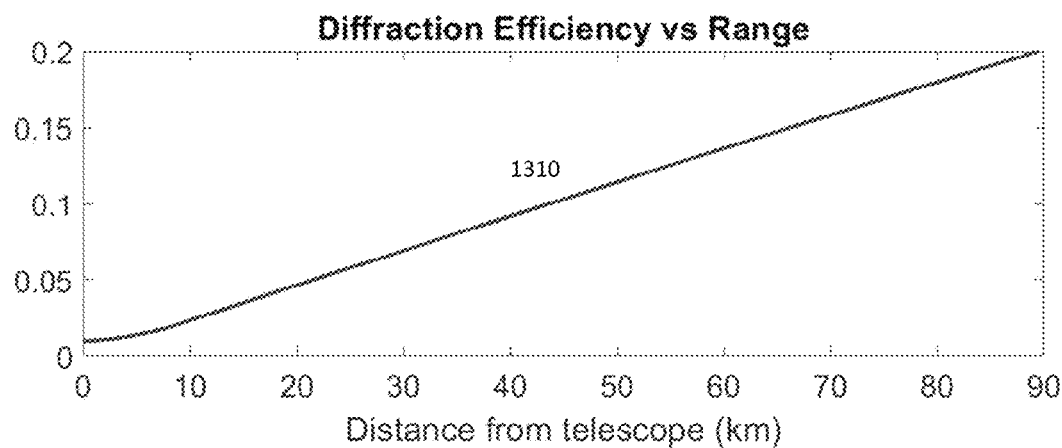
FIG. 13A
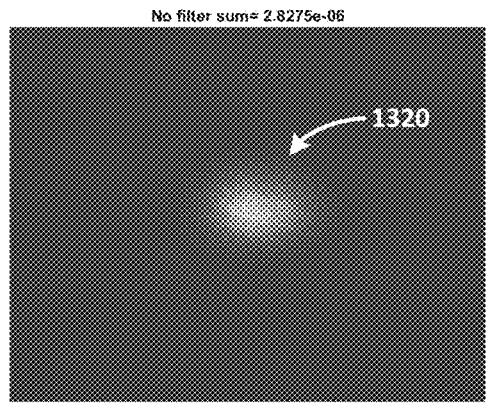
FIG. 13B
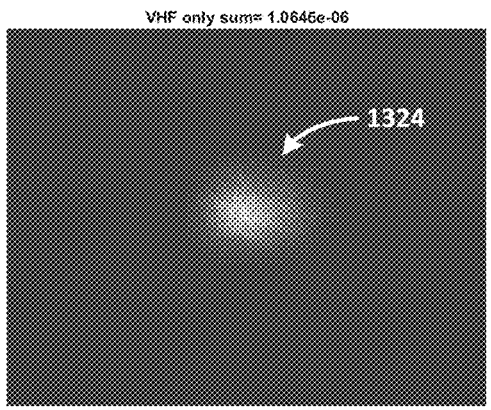
FIG. 13C
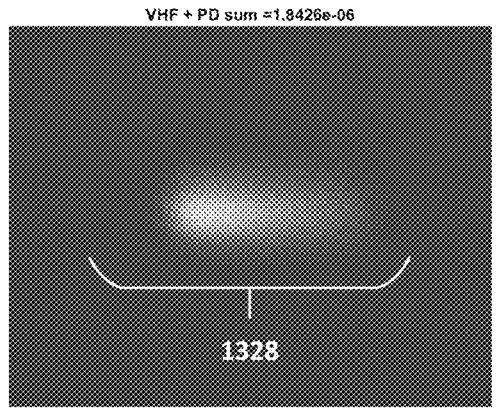
FIG. 13D
Case 1:
Thickness = 1 mm
Angle = 5°
VHF only eff = ~38%
VHF+PD eff = ~65%
$r_0$ = 11 cm @750nm
$\sigma_{tilt}$ = 2.3 μrad
FIG. 13E FIG. 14A
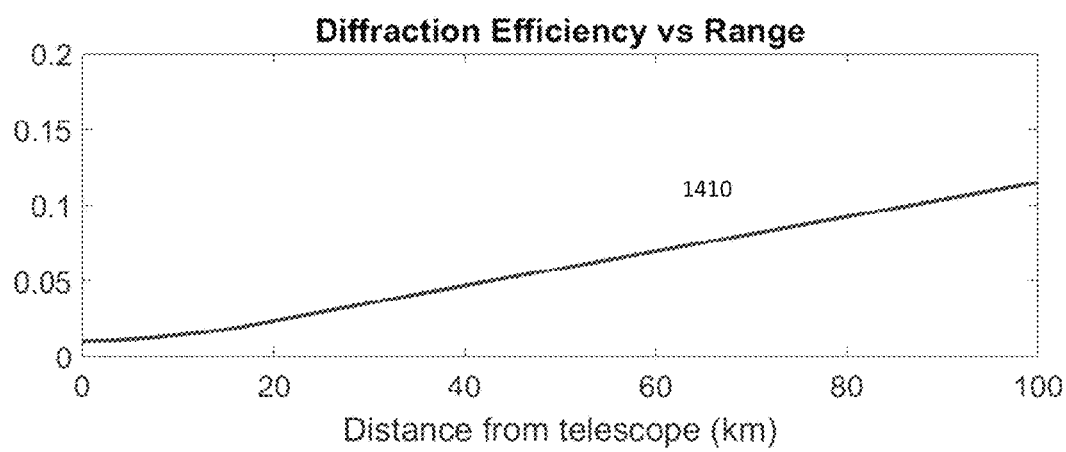
FIG. 14B
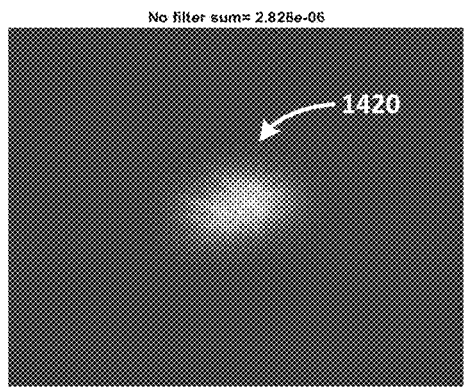
FIG. 14C
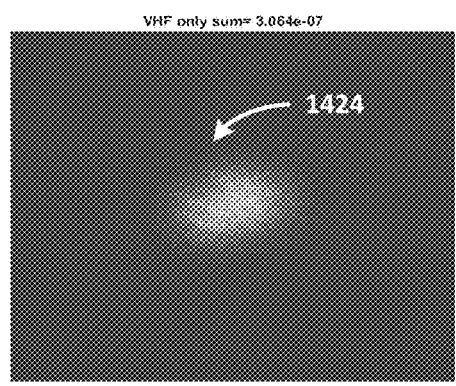
FIG. 14D
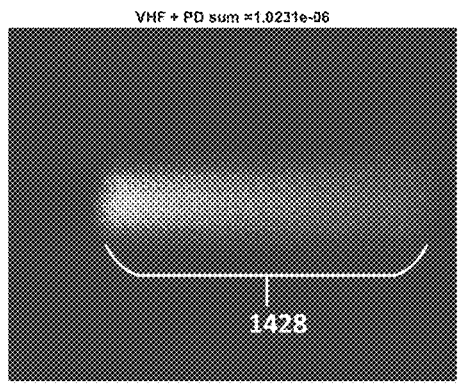
FIG. 14E
Case 2:
Thickness = 1 mm
Angle = 10°
VHF only eff = ~11%
VHF+PD eff = ~36%
$r_0$ = 11 cm @750nm
$\sigma_{tilt}$ = 2.3 μrad

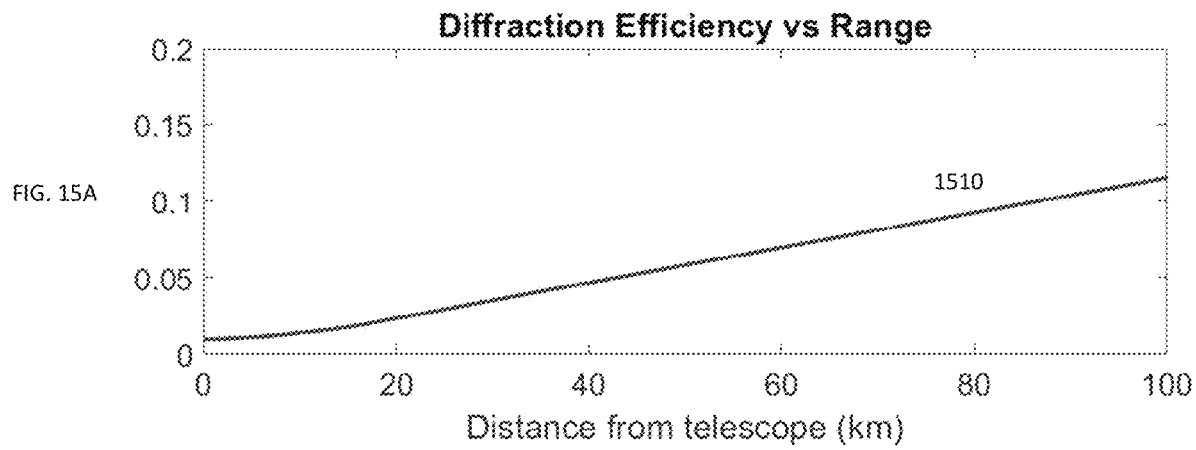
FIG. 15A
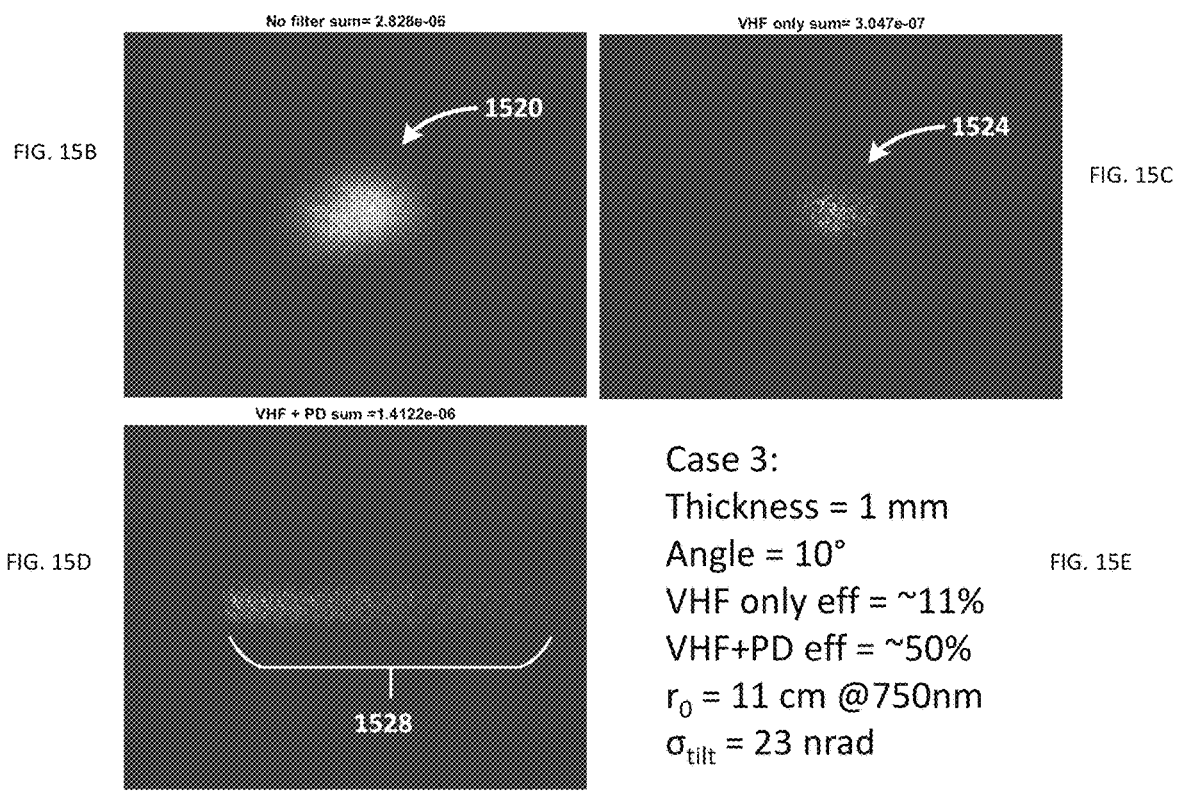
FIG. 15B
FIG. 15C
FIG. 15D
Case 3:
Thickness = 1 mm
Angle = 10°
VHF only eff = ~11%
VHF+PD eff = ~50%
$r_0$ = 11 cm @750nm
$\sigma_{tilt}$ = 23 nrad
FIG. 15E

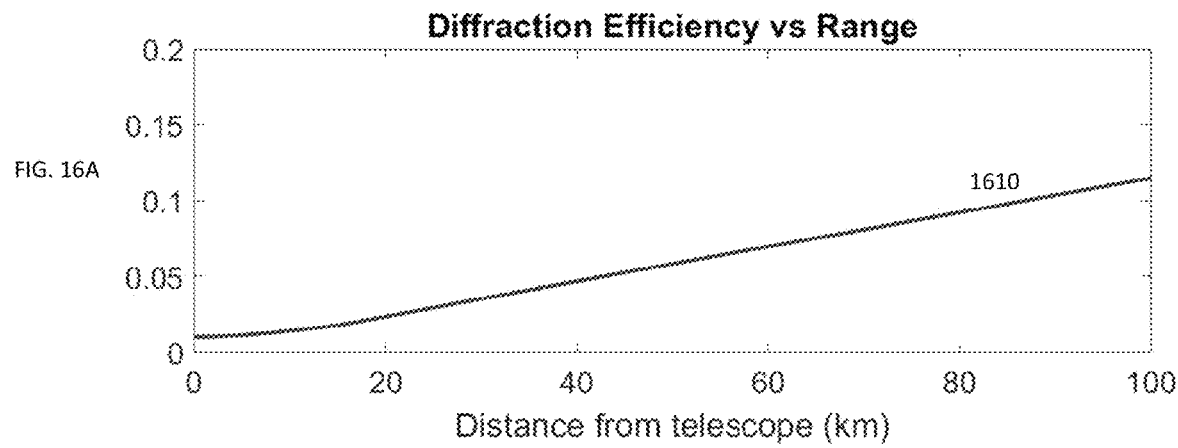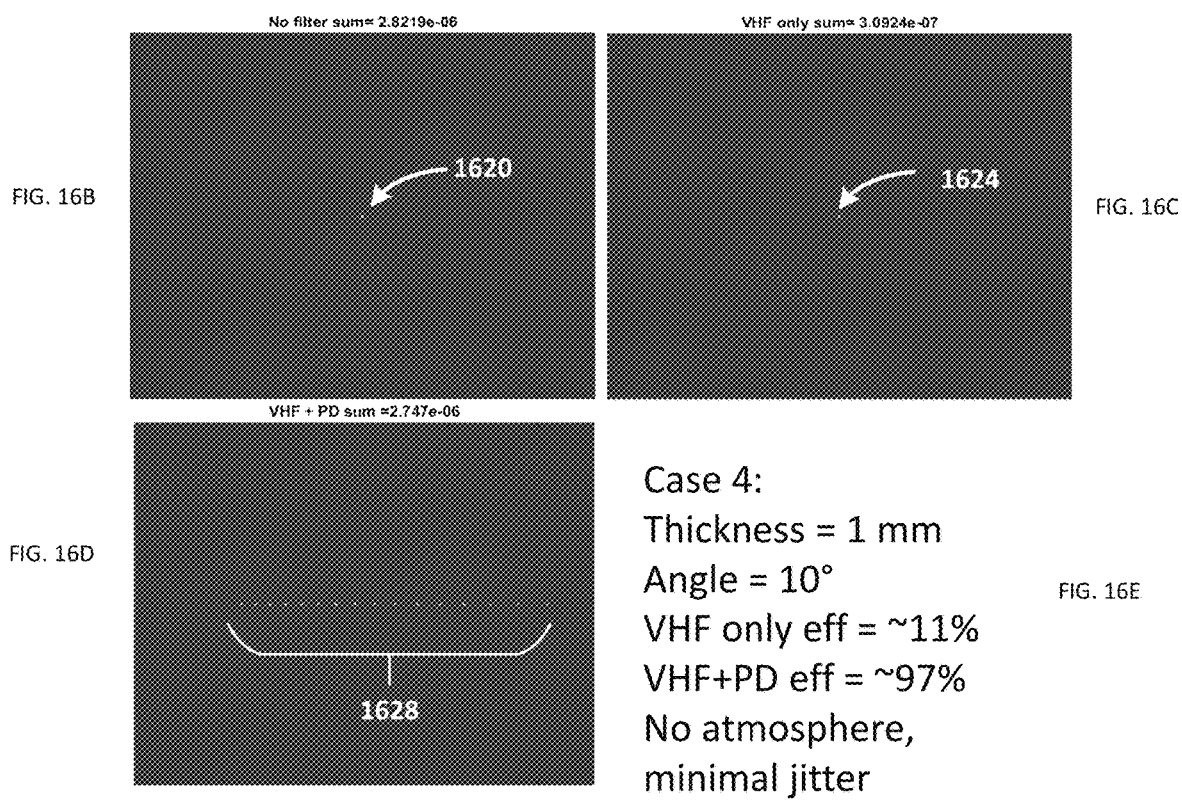

ENHANCING DAYTIME DETECTION OF OBJECTS WITH THE USE OF A SYSTEM INCORPORATING DUAL DIFFRACTIVE ELEMENTS WITH CORRESPONDING DIFFRACTION EFFICIENCIES AND BANDWIDTHS

CROSS-REFERENCE TO RELATED APPLICATIONS

The present application claims priority from the U.S. Provisional Patent Applications Nos. 62/641,849 filed on Mar. 12, 2018 and 62/716,271 filed on Aug. 8, 2018. The disclosure of each of these provisional applications is incorporated by reference herein.

TECHNICAL FIELD

The invention generally relates to optical filtering that facilitates the optical imaging or observation of objects with a ground-based optical system and, in particular, to optical imaging systems and methods for optical detection of objects during daytime, in conditions when bright daylight collected by the imaging system at least partially conceals the object.

SUMMARY

Embodiments of the invention address a problem of reducing (or even completely preventing) light arriving at the optical imaging system from the space surrounding the object of interest from reaching the optical detector, thereby increasing the spatial and/or spectral selectivity of imaging of a target object in background light while, at the same time, increasing the signal-to-noise ratio of the desired signal in comparison with that provided by the background.

In particular, embodiments provide a method for selective optical detection of an object from a plurality of objects. Implementation of such method involves the use of the first optical system, with which the following steps are performed: (i) forming a first beam of light collected from a first spatial area and impinging on an optical filter to generate a second beam of light in transmission of the first beam of light through the optical filter, while, at the same time, forming a third beam of light collected from a second spatial area (the third beam impinging on the same optical filter) to generate a fourth beam in transmission of the third beam of light through the optical filter. Here, the first beam has a first degree of spatial convergence and propagates along a first axis, the second beam has a second degree of spatial convergence and propagates along a second axis, the third beam has a third degree of spatial convergence and propagates along a third axis, and the fourth beam has a fourth degree of spatial convergence and propagates along a fourth axis. The first, third, and fourth axes substantially coincide with one another, and the first and second spatial areas differ from one another. The method further includes the step performed with the use of a second optical system (that is disposed substantially coaxially with the second axis to intersect the second beam): such step is a step of forming a first optical image of the first spatial area at a first imaging plane that is optically-conjugate with the first spatial area.

In one implementation, the action of forming the first beam includes forming the first beam of light as a result of transmission of light collected from the first spatial area through a holographic layer containing a hologram and/or the action of forming the first optical image includes forming the first optical image in light from the first spatial area that is viewed, by the first optical system, at a first angle. (The first angle exceeds a second angle that is an angle of acceptance of the hologram.)

Alternatively or in addition, the action of forming the first optical image includes forming the first optical image in the light collected from the first spatial area, where such light has passed through a combination of first and second optical holograms, each of the first and second holograms defining a corresponding optical diffractive filter. In this latter case, a first diffractive filter has a first angle of acceptance, a second optical diffractive filter has a second angle of acceptance, and a ratio of the first angle of acceptance to the second angle of acceptance is at least 10, preferably at least 100, more preferably at least 500. Furthermore, in one specific case an additional step is performed of forming a second optical image with the fourth beam of light in a second imaging plane, the second optical image being a virtual optical image.

In a related implementation of the method, the method additionally includes the step of collecting light (with the second optical system), which has diffracted in transmission through a diffraction grating of the holographic layer, along the second axis that is inclined with respect to the first axis. Here, each of the first and second beams is a substantially collimated beam while each of the third and fourth beams is a substantially not-collimated beam.

In another related implementation, one of the following conditions is satisfied. The first condition is a combination of: (i) the first optical system includes first and second optical elements having first and second optical powers, respectively, (ii) one of the first and second optical powers is positive, and the other of the first and second optical powers is negative. The second condition is: the first optical system includes a single, stand-alone optical element having a positive optical power. Alternatively or in addition, the second axis is substantially coincident with the first axis, while each of the first, second, third, and fourth beams is a substantially non-collimated beam.

The method may additionally include (i) changing at least one of i) an optical characteristic of the optical filter and ii) at least one of mutual orientation and positioning of the optical filter and the first optical system to form an optical image of a third spatial area at the first imaging plane, the third spatial area and the second spatial areas being different from one another, and/or (ii) positioning the second optical system with respect to the first optical system such as to form an optical telescope configured to form the first optical image of the first spatial area; and receiving light from the second beam of light at the optical detector.

Embodiments of the invention additionally provide an optical imaging system that includes a first diffractive element with a first spectral characteristic and a second optical diffractive element with a second spectral characteristic. The second optical diffractive element is disposed to receive a first light wavefront diffracted at the first optical diffractive element and to form second light wavefront as a result of diffraction of the first light wavefront at the second optical diffractive element.

The first spectral characteristic has a first portion representing a first diffraction efficiency of the first optical diffractive element as a function of wavelength of light for a chosen first angle of incidence of the light onto the first optical diffractive element, the first spectral characteristic having a first bandwidth. The second spectral characteristic has a second portion representing a second diffraction efficiency of the second optical diffractive optical element as a function of the wavelength for a chosen second angle of incidence of the first light wavefront onto the second optical diffractive element, the second spectral characteristic having a second bandwidth. (In one specific implementation, an absolute value of a difference between the chosen second angle of incidence and the chosen third angle of incidence is a value within the range from zero degrees and twelve degrees.)

The second bandwidth is narrower that the first bandwidth. (In one particular case, the second spectral characteristic may additionally include a third portion representing third diffraction efficiency of the second optical diffractive optical element as a function of the wavelength of light for a chosen third angle of incidence onto the second optical diffractive element, the third portion having a third bandwidth. Here, the third bandwidth is narrower that the first bandwidth.) The optical imaging system additionally includes an optical detector positioned to receive light from the second wavefront and produce an output signal representing distribution of irradiance of the second wavefront across the optical detector.

The optical imaging system may further include a combination of at least first and second optical elements, each of these first and second optical elements dimensioned to change a degree of divergence of light incident on such optical element. Here, the first optical element from the combination is disposed to transmit light incident thereon towards the first optical diffractive element, and the second optical element from the combination is disposed to receive the second wavefront and to relay it to the optical detector. The combination of the at least first and second optical elements may be configured as a telescope. (In one specific case, the first and second optical elements are not disposed co-axially with one another.)

At least one of the first and second optical diffractive elements is configured as a holographic layer carrying a hologram therein; and/or the first optical diffractive element may be configured as a first holographic diffraction grating having a first thickness, while the second optical diffractive element may be configured as a second holographic diffraction grating having a second thickness (in the latter case, the first thickness is smaller than the second thickness). Alternatively or in addition, the first and second optical diffractive elements are separated from one another by a substantially zero distance.

Depending on the implementation, a ratio of the first bandwidth to the second bandwidth is at least 10; preferably at least 20; more preferably at least 50; more preferably yet at least 70; even more preferably at least 100; and most preferably at least 500. A ratio of the first bandwidth to the second bandwidth is at least 50; preferably at least 100; more preferably at least 500; and most preferably at least 1,000. In one specific case, the first bandwidth is greater than a sum of i) the second bandwidth, ii) the third bandwidth, and iii) a spectral separation between a central wavelength of the second bandwidth and a central wavelength of the third bandwidth.

In a related implementation of the optical imaging system, the first optical diffractive element contains a diffraction grating characterized by a first spatial frequency, the second optical diffractive element contains a diffraction grating characterized by a second spatial frequency, and the first spatial frequency is substantially equal to the second spatial frequency. Additionally or in the alternative, the first optical diffractive element includes a holographic layer containing a hologram with a refractive index modulation of at least 0.001.

BRIEF DESCRIPTION OF THE DRAWINGS

The following disclosure will be better understood in reference to the following accompanying generally not-to-scale Drawings, of which:

FIGS. 13A, 13B, 13C, 13D, and 13E illustrate performance of an embodiment of the invention. FIG. 13A: a plot of dependency of efficiency of diffraction of light arriving from the target object on a distance between the target object and the particular embodiment of the invention; FIGS. 13B, 13C, 13D—images obtained with i) the use of only the telescopic system in absence of any holographic filter; ii) the use of the telescopic system equipped only with the VH filter; and iii) the use of the telescopic system equipped with both the VH filter and the pre-dispersor (PD), respectively. FIG. 13E: listing of some parameters of the embodiment and performance characteristics.

FIGS. 14A, 14B, 14C, 14D, and 14E illustrate performance of a related embodiment of the invention. FIG. 14A: a plot of dependency of efficiency of diffraction of light arriving from the target object on a distance between the target object and the particular embodiment of the invention; FIGS. 14B, 14C, 14D—images obtained with i) the use of only the telescopic system in absence of any holographic filter; ii) the use of the telescopic system equipped only with the VH filter; and iii) the use of the telescopic system equipped with both the VH filter and the pre-dispersor (PD), respectively. FIG. 14E: listing of some parameters of the embodiment and performance characteristics.

FIGS. 15A, 15B, 15C, 15D, and 15E illustrate performance of an embodiment of the invention. FIG. 15A: a plot of dependency of efficiency of diffraction of light arriving from the target object on a distance between the target object and the particular embodiment of the invention; FIGS. 15B, 15C, 15D—images obtained with i) the use of only the telescopic system in absence of any holographic filter; ii) the use of the telescopic system equipped only with the VH filter; and iii) the use of the telescopic system equipped with both the VH filter and the pre-dispersor (PD), respectively. FIG. 15E: listing of some parameters of the embodiment and performance characteristics.

FIGS. 16A, 16B, 16C, 16D, and 16E illustrate performance of an embodiment of the invention. FIG. 16A: a plot of dependency of efficiency of diffraction of light arriving from the target object on a distance between the target object and the particular embodiment of the invention; FIGS. 16B, 16C, 16D—images obtained with i) the use of only the telescopic system in absence of any holographic filter; ii) the use of the telescopic system equipped only with the VH filter; and iii) the use of the telescopic system equipped with both the VH filter and the pre-dispersor (PD), respectively. FIG. 16E: listing of some parameters of the embodiment and performance characteristics.

Figure 1A:
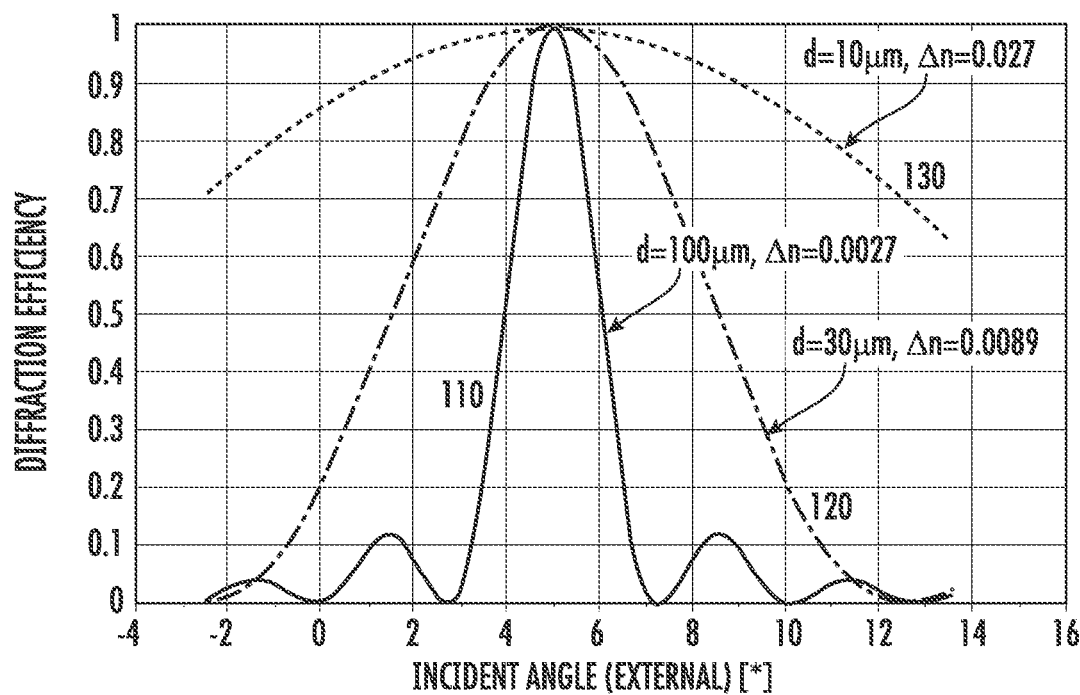
FIG. 1A shows plots representing diffraction efficiency curves according to the angle of incidence (blaze curve) for volume holographic filters with different thicknesses (d=10, 100, and 1000 µm) and different index contrast values. The hologram index modulation vary in inverse proportion to the thickness. The grating spacing for each of the holographic filters is 327 lp/mm, the wavelength of incident light is 532 nm.

Generally, the sizes and relative scales of elements in Drawings may be set to be different from actual ones to appropriately facilitate simplicity, clarity, and understanding of the Drawings. For the same reason, not all elements present in one Drawing may necessarily be shown in another.

DETAILED DESCRIPTION

The holograms have already been used to transform (diffract) an incident optical wavefront into a predetermined optical wavefront—for example, the use for this purpose of volume holograms configured as optical diffractive elements. One example of such transformation of the incident wavefront is the formation of holographic 3D images that are generated from an incoming plane wave. The use of volume holograms to selectively filter—as a result of optical diffraction—a specific wavefront from the plurality of incident wavefronts has not been practically employed yet, however.

When an optical diffractive element defined by the volume hologram is thick enough for the light wave to consistently interact with the index modulation pattern defining such optical diffractive element, the known Bragg condition is enforced, and the efficiency of diffraction (interchangeably referred to herein as diffraction efficiency) decreases dramatically outside of the angular region represented by this specific condition:

$$\sin\theta_B = m\frac{\lambda}{2\Lambda} \quad (1)$$

Here, $\theta_B$ is the Bragg angle, $\lambda$ is the wavelength of light, $\Lambda$ is the fringe spacing of the holographically-defined diffraction pattern of the optical diffractive element (~ the period of the holographic diffraction grating), and m is the order number (integer).

This property can be used to diffract a predetermined wavefront, while letting others pass through the material unaffected. This can be used to select the light coming from a precise distance, such as a satellite, and discard the light coming from other sources, such as sky scattering. Indeed, light emitted from different distances have different wavefront curvature to which the hologram is sensitive.

Holograms that have a narrow band selectivity can be referred to as "thick": such holographic diffraction elements operate in the Bragg regime. Holograms that are not as selective, comparatively speaking, often referred to as "thin", and operate in the Raman-Nath regime. The transition between these two regimes of operation is not abrupt, but varies gradually with the thickness of a particular hologram and other hologram-related parameters. The mathematical criteria that defines the boundary between the two regimes of operation captures such parameters:

$$Q' = \frac{2\pi\lambda}{n\Lambda^2\cos\theta}d \quad (2)$$

Here, d is the thickness of the hologram, and n is the index of refraction of the material of the hologram, and $\Lambda$ is the fringe spacing of the diffraction pattern. When Q'<1, the hologram is not selective and is referred to as thin. When Q'>10, the hologram is considered to operate in the Bragg regime, it is more "selective"—for example, in angular space, and is referred to as "thick".

The angular selectivities of different holographically-defined optical diffractive elements can be assessed by comparing their blaze curves. A blaze curve represents the dependency of efficiency (with which the hologram diffracts the incident optical wavefront) on the angle of incidence of such wavefront onto the hologram. Among other known techniques, the blaze curve can be calculated with the use of the Kogelnik coupled-wave analysis, for example. As an illustration, FIG. 1A shows several plots—110, 120, and 130—illustrating blaze curves for various holograms (each of which is characterized by corresponding thicknesses and refractive index contrast values, and each of which is configured to operate optimally, at a given wavelength of light, at a chosen angle of incidence chosen to 5 degrees, in this instance). It can be observed that when the physical thickness of a holographically-defined diffraction grating increases, the angular selectivity of operation of such volume hologram increases as well.

Figure 1B:
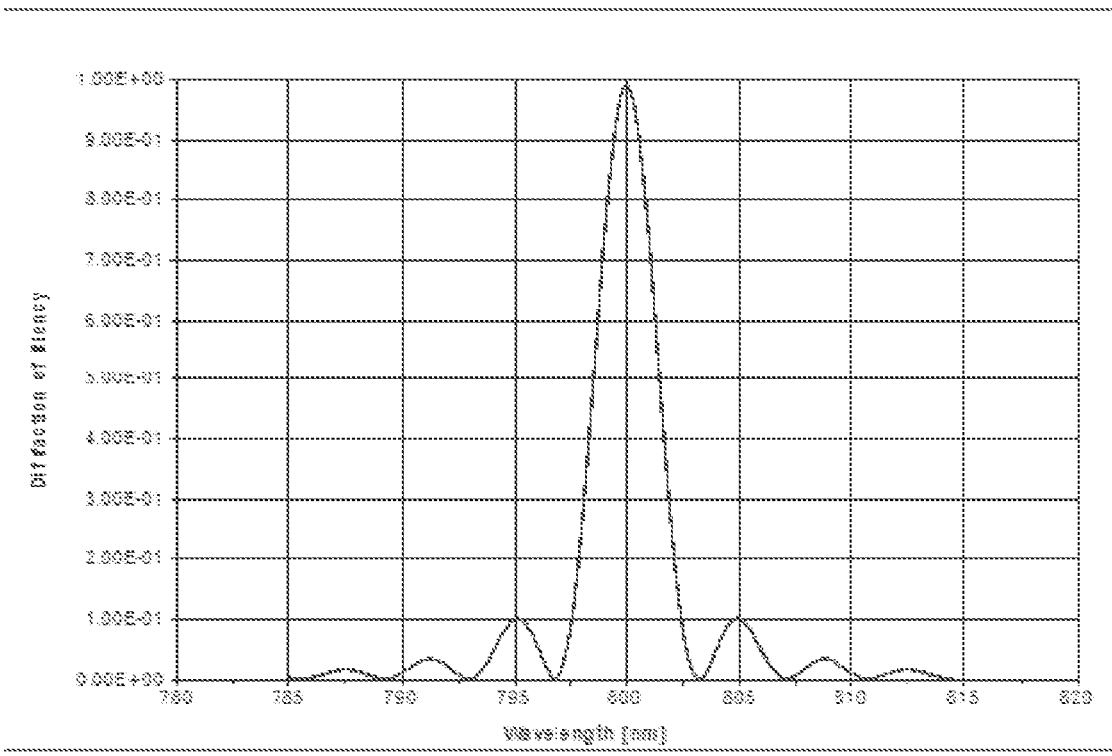
FIG. 1B is a plot of a spectrally-dependent diffraction efficiency characteristic for a volume hologram designed to operate at a chosen angle of incidence.

Understandably, once the nominal angle of incidence of a wavefront on a given hologram (configured as an optical diffractive element) has been chosen, the diffractive efficiency of such hologram also exhibits spectral selectivity; that is, the diffraction efficiency of such holographic diffractive optical element is a function of wavelength of light, incident on the hologram at the nominal angle—see the example of FIG. 1B.

The idea of the invention stems from the realization that the selective imaging of a part of an overall field-of-view (FOV) of an optical imaging system can be facilitated based on spatial (in particular—angular) and/or wavelength selectivity of a volume hologram, configured as an optical filter that is part of the optical imaging system. As a result of such selective optical imaging of a sub-portion of the FOV, the object of interest within the FOV is being imaged while light received by the imaging system from the background or "unwanted" portions of the imaging scene is being generally rejected or ignored or not used, from the point of view of the imaging process. (For example, the imaging of a target object in space occurs while, at the same time, rejecting or reducing the level of a background signal associated with daylight in the atmosphere.)

Figure 2:
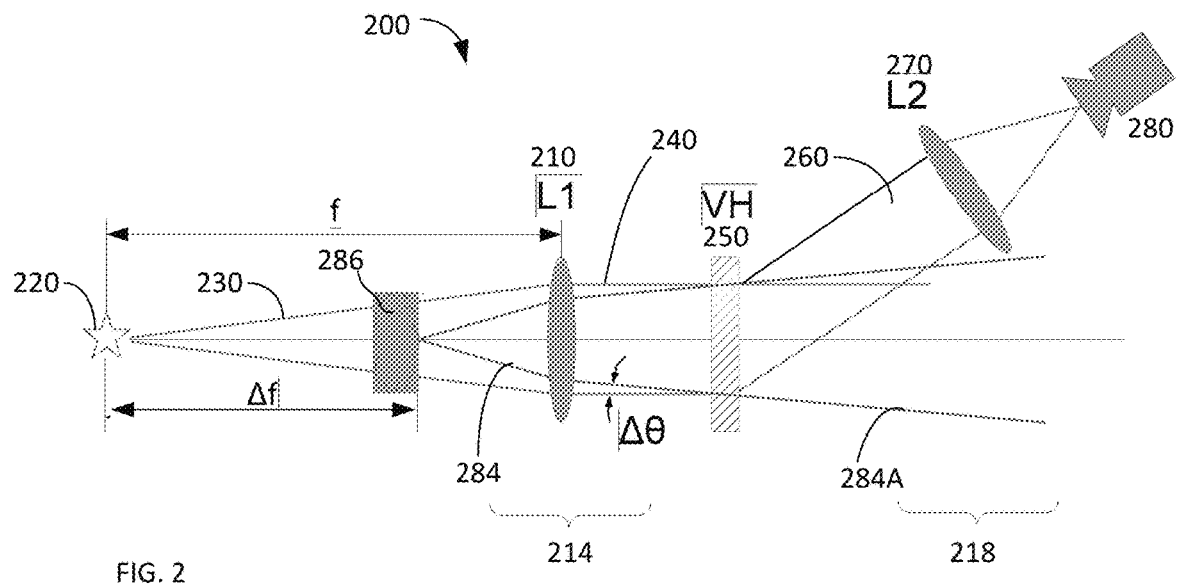
FIG. 2 is a schematic diagram depicting a telescope system utilizing a volume hologram (VH) to select an object at a specified viewing distance.

A system employing a volume hologram. FIG. 2, for example, schematically illustrates the implementation 200 employing a volume hologram VH, configured as an optical diffractive element (diffraction grating) in a telescopic optical system. The first optical element—shown as the lens element L1, 210—is disposed to collimate light 230 arriving from the object of interest 220 (which is separated from the element 210 by about the focal distance, f, of the element 210). The so-collimated light 240 (the first wavefront) is then directed to the VH 250, the surface of which in this example is shown to be substantially perpendicular to the optical axis 254. At the VH 250, the first wavefront 240 is diffracted, upon transmission through thee VH 250, to form light or optical wavefront 260 propagated towards the second optical element 270 (shown as a lens element L2). The lens element 270, in turn, focuses the diffracted optical wavefront 260 on the light-capturing surface of the optical detector 280. At the same time, the auxiliary light (a second optical wavefront) 284 that arrived onto the element 210 from any spatial point separated from the element 210 by a distance different from the focal length f—that is the optical front that is "out of focus" of the element 210—is, understandably, not collimated as desired. (For example, light that arrives at the element 210 from the auxiliary object or secondary volume of space 286, separated from the object of interest 220 by a distance Δf, is converged by the element 210 to arrive at the VH 250 at a different, non-zero angle, Δθ.) Hereinafter, the combination of the optical components preceding the volume hologram of the system (as shown, the lens element 210) is referred to as an optical system 214, and the combination of the optical components relaying light from the volume hologram of the overall system to the optical detector 280 (in this embodiment—the lens element 270) is referred to as an optical system 218.

Due to the angular selectivity of the hologram VH 250, the angle of incidence Δθ of the auxiliary second wavefront 284 at a chosen wavelength falls outside of the angular band of diffraction of the holographic filter 250, and the second wavefront 284 is not diffracted by the VH 250 and, therefore, passes through the hologram 250 substantially unaffected to form the throughput light 284A. Accordingly, light from the second wavefront 284 does not reach the element L2 and/or is not registered by the detector 280.

Figure 3:
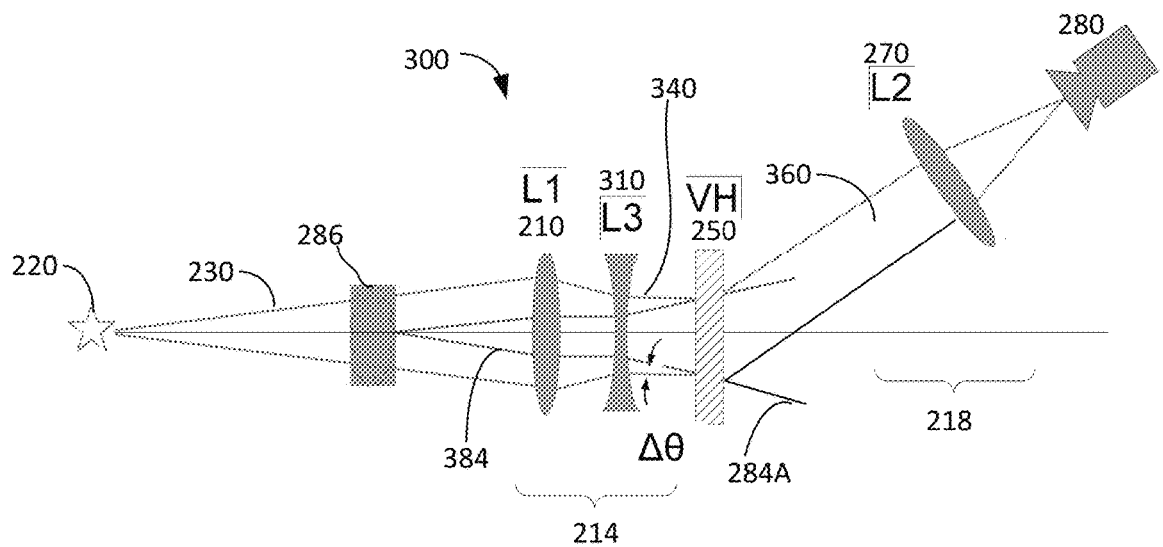
FIG. 3 illustrates the imaging system the spatial (specifically, angular) imaging selection of which is increased as compared to that of the system of FIG. 2. Such increase is achieved as a result of increasing the difference between the angle of incidence of light arriving at the optical diffractive filter from the chosen target and that of light arriving at the optical diffractive filter from the background area of space, caused by the use of relay optics.

Once the angle of incidence (on the VH 250) of the light-wavefront to be selectively diffracted towards the optical detector 280 by the VH 250, has been chosen—and in the example of FIG. 2, such angle is shown to be the angle of normal incidence, or the angle of substantially zero degrees with respect to the normal drawn to the incident surface of the VH 250—the use of additional relay optics in the telescopic imaging system may be used to facilitate the increase of the spatial selectivity of the imaging system containing the optical diffractive filter 250. FIG. 3 illustrates the related implementation 300, in which the spatial (specifically, angular) imaging selection of the imaging system built around the optical telescope is increased as compared to that of the system 200 of FIG. 2. Such increase is achieved, in this example, as a result of employing the relay optics 310 that causes the increase of the difference Δθ between the two angles of interest. The first angle is the angle of incidence of a light wavefront 340 (formed by the light 230 generated by the object 220 and collected by the combination of the lens element 210 with the relay optics 310, shown here as a negative power lens element L3) onto the optical diffractive filter 250. The second angle is the angle of interest of light 384, arriving at the optical diffractive filter 250 from the background area of space 286.

As is schematically shown in FIG. 3, when the relay optics 310 is present in the imaging system, the VH optical filter 250 is configured to diffract the incident beam of light 340 into the substantially-collimated beam of light wavefront 360, which is further focused by the lens element 270 onto the detector 380 (in a fashion described above in reference to FIG. 2). At the same time—in a fashion similar to that described above—the angle of incidence of the light 384 onto the filter 350 falls outside the bandwidth of the blaze curve of the filter 250 and, as a result, the light 384 is not diffracted at the filter 250 and substantially passes through this filter and is not collected by the lens element 270.

In further reference to both FIGS. 2 and 3, to the degree that a portion of light 284, 384 may be captured by the lens element 270, a person of skill in the art will readily appreciate that this lens element 270 forms an optical image of the (background) spatial area that is different from the target object 220 in a second imaging plane that is different from the surface of the detector 280.

Referring again, for simplicity of presentation, to the basic telescopic imaging system illustrated in FIG. 2, and replacing the angular parameter in the coupled-wave equation with the defocusing distance Δf (the distance at which an instantaneous plane of observation is separated from the object distance, to which the imaging system is focused), the theoretical diffraction efficiency η—of the optical diffractive filter formed by the VH 250—can be expressed as:

$$\eta = \frac{1}{\pi} \int_0^{2\pi} d\phi \int_0^1 d\rho \mathrm{sinc}^2\left(\frac{A d\theta \Delta f}{n\lambda f^2}\rho\sin\phi\right) \quad (3)$$

Here, A is the radius of the aperture defined by the element L1, 210; d is the thickness of the hologram VH, 250; n is the refractive index of the material of the VH, 250; λ is the wavelength of light; f is the focal length of the element L1, 250; Δf is the longitudinal defocus (the separation distance between the object of interest 210 and the secondary portions of space 286); and ρ and φ are the radial and angular integration variables in the unit circle integration domain.

Using Eq.3, the bandwidth of the blazing curve of the optical diffractive element 250 (measured, for example, as the full width at a half maximum level, FWHM) is expressed according to the longitudinal defocus:

$$\Delta z_{FWHM} \propto \frac{\lambda f^2}{Ad} \quad (4)$$

In practice, volume holograms—such as optical diffractive element 250, containing a diffraction grating that is judiciously configured to a selectively diffract and redirect the wavefront of interest 240, 340 from the object of interest 220 towards the optical detector 280 while, at the same time, to at least reduce the amount of background light (i.e., light from the remaining portion of the FOV of the imaging system 200, 300) that reaches the detector 280—can be manufactured using different media. Commercially available photopolymers such as Bayfol HX200 from Covestro AG, for example, can be used due to the ease of processing. These photopolymers, however, are only available in a form of thin film (with thickness of about 16 µm or so). While such small values of thickness may be sufficient to achieve satisfactory efficiency of diffraction of light, these values were shown to be insufficient to achieve the narrow-enough—for operational purposes of an embodiment of the invention—angular selectivity of an object versus the background.

Other examples material options for fabrication of VHs for embodiments of the invention include dichromated gelatin or silver halide materials, that can be laid down with smaller thicknesses (up to a hundred of microns, for instance).

For comparatively thicker VH media, photo-initiated poly (methyl methacrylate) (PQ/PMMA) and photo-thermo-refractive (PTR) glasses can be formed into sheets that are several millimeters thick. Both PMMA and PTR glasses are known to have large windows of transparency in the visible and near IR spectral regions, which may allow their use in a specific application of an embodiment of the invention—such as improvement of imaging or detection of an object (such as a satellite) with the ground-based imaging system in daylight conditions.

Figure 4:
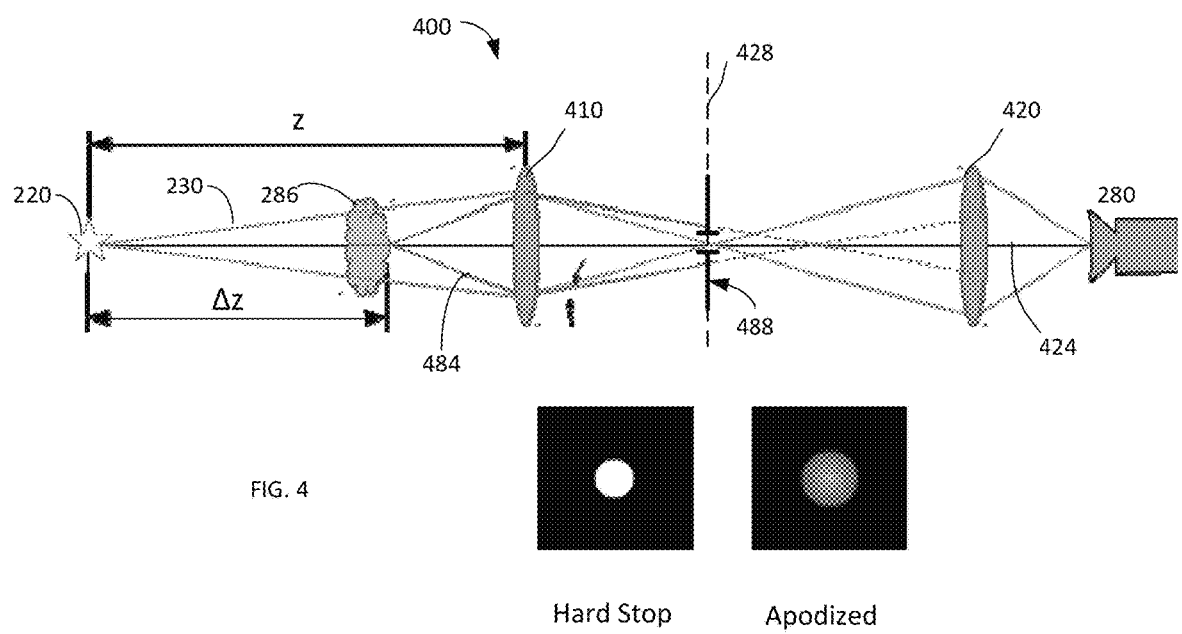
FIG. 4 is a schematic diagram of an optical system in a confocal configuration, configured for rejection of atmospheric scattering during the process of imaging of the chosen object.

A confocally-configured imaging system. A person of skill in the art will appreciate that implementations of the methodology and system configured to reject the background signal (for example, daylight scatter in atmosphere), while still imaging the object of interest, that are devoid of a volume hologram may employ a confocally-configured system. A non-limiting schematic 400 of the optical system is presented in FIG. 4. Here, light 430 from both the target object 220 is collected by the optical system containing the first lens element 410 and the second lens element 420 (shown being coaxial with the axis 424), with the intermediate image of the object 220 formed at the intermediate image plane 428 and the final image being formed at the surface of the optical detector 280. Light 484 from a spatial area that is different from the object 220 (as shown—separated from the object 220 by a distance Δz) is imaged onto a plane different from the plane 428. An aperture stop (a pinhole element) 488 is introduced at the focal plane of the objective lens element to selectively pass light arriving from the object plane and block the auxiliary light arriving from another location.

The aperture stop 488 can be configured as a hard aperture (that is, as a pinhole with the transmission function or aperture function that is substantially constant across the area of the aperture opening), but in that case diffraction of light at the hard edge of the aperture stop 488 may reduce the quality of optical image formation at the image plane of the detector 280. To solve this problem, an apodized aperture (the opening with an apodized aperture function, for example the aperture transmission function that is not constant across the aperture opening) can be used.

A skilled artisan immediately appreciates that both types of imaging systems—the one including a hologram-based optical diffractive filter such as the system 200 or 300 and the one employing the fixed aperture stop possesses a practical limitation caused by stemming from the limited FOV of the spatial filter of the system. In the case of the configuration similar to those of embodiments 200, 300, the fixed blazing curve of the diffraction grating 250 does not allow, for example, the imaging of an object point the angular deviation of which from the chosen angular position (for example, a position on axis of the imaging system) exceeds the bandwidth of the blazing curve. (Notably, the same blazing curve of the holographic element limits the bandwidth of wavelengths within which the imaging of the target object can be selectively enhanced once the angular position of the object has been decided upon.) Similarly, in the case of the fixed aperture stop 4800 of the embodiment similar to the embodiment 400, the aperture stop blocks the light arriving at the optical system from a target object's point that is located off the axis 424.

Figure 5:
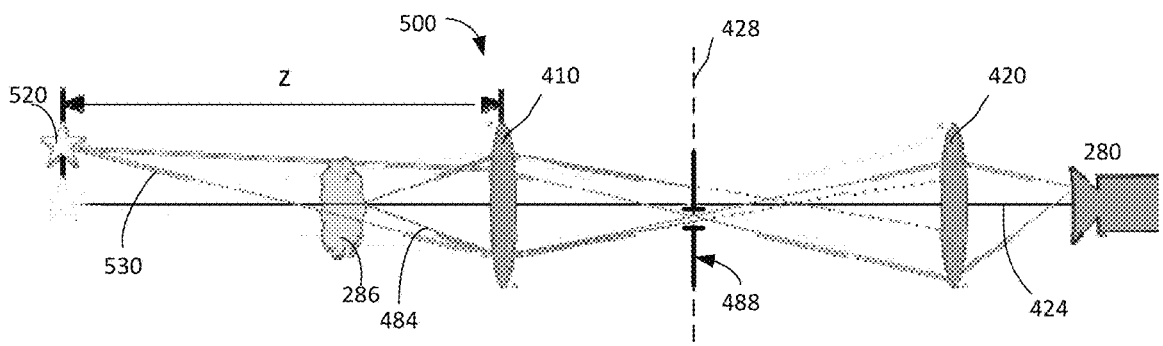
FIG. 5 illustrates the process of scanning the field of view of the optical imaging system with a programmable aperture (such as SLM or DMD).

In the embodiment employing the aperture stop this problem can be addressed, for example, with the use of a programmable and/or repositionable aperture stop configured to scan the field of view. The schematic 500 of this related configuration is presented in FIG. 5, in which the imaging of an off-axis target object 520 (and/or an off-axis point of a target object) is carried out as a result of repositioning/translating of the aperture 488 in a direction transverse to the axis 424 of the imaging system (that is, in a plane 428) while, at the same time, reducing the amount of light 584 arriving at the imaging system from a spatial area that is different from the off-axis object 520. In one example, a spatial light modulator (SLM) device a digital micromirror (DMD) device can be used to effectuate the programmable aperture. Alternatively, the field of view of the optical imaging system can be scanned using a gimbals mirror while maintaining the aperture opening fixed in space. In comparison, the plane-parallel translation of the holographic element 250 in the embodiments 200, 300 does not achieve the same result.

Imaging system employing a pre-dispersor hologram and its calculated performance. The problem of inability of the imaging system, equipped with a volume hologram configured as an optical diffractive element, to image the spatially-extended target object without scanning the FOV of the system—that is, the problem of inability of such system to simultaneously image all portions of the target object within the solid angle that the object subtends (while, at the same, reducing or even eliminating the unwanted background signal at the detector based on the principle of selective diffraction of light at the volume hologram) is solved by employing, in the imaging system, a sequence of first and second volume holograms that are configured to operate as a sequence of optical diffractive elements possessing different blazing curves. One of such volume holograms, referred to as a pre-dispersor hologram (or a pre-dispersor filter, or just a pre-dispersor, for short), in intended to have a comparatively small thickness and a comparatively broad spectral selectivity, allowing the pre-dispersor to diffract light in transmission within a very large range of the angles of incidence. The other of such volume holograms, referred to as a main hologram or a main diffractive filter, possesses the spectral selectivity that is very narrow in comparison with that of the pre-dispersor, and a thickness that is substantially larger than that of the pre-dispersor. The use of the combination of the pre-dispersor and the main filter not only allows the selective imaging of the chosen target object (according to the principle of operation discussed in reference to FIGS. 2, 3) at every angle at which various portions of the object are seen at the optical system, but also facilitates the spectroscopic measurements of such object.

Figure 6:
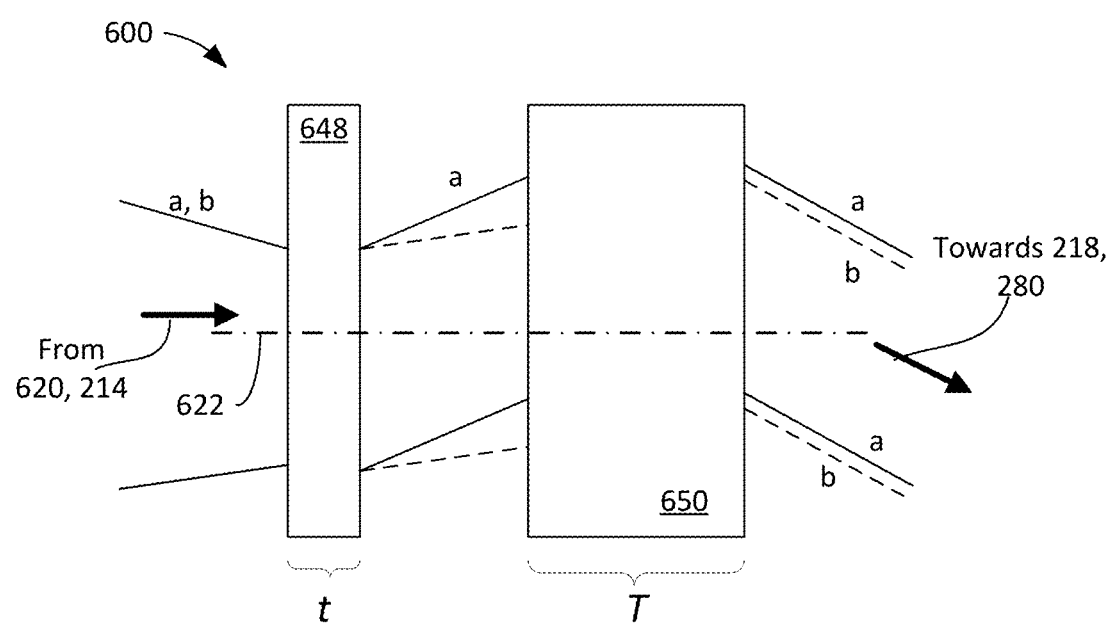
FIG. 6 is a schematic diagram illustrating an embodiment of a device containing a combination of a pre-dispersor hologram and a main hologram.

The schematic arrangement 600 of the combination of the pre-dispersor 648 having a thickness t and the main hologram 650 having a thickness T (t<<T) in a telescopic imaging system is illustrated in FIG. 6. Labels "a" and "b" denote different wavelengths of light.

According to the embodiment of the invention, the pre-dispersor is configured to diffract (in transmission) light from a particular portion of the object at a wavelength that depends on the angular position of such portion as viewed with respect to the reference axis (for example, an axis 622 of the system). The angular selectivity of the pre-dispersor (with respect to the angles of incidence of wavefronts of light incident onto the pre-dispersor) is extremely limited— as compared with that of the main filter—and the pre-dispersor transmits (diffracts in transmission) light arriving from both the background and the object. The main hologram or filter, on the other hand, is configured according to the principle of the element 250 of FIG. 2 and does selectively transmits only an optical wavefront incident upon it at a predetermined angle of incidence, to achieve the result of not transmitting the background light.

Accordingly, in light transmitted through both the pre-dispersor 648 and the main hologram 650, the optical imaging system that contains the arrangement 600 is enabled to characterize not only a spatial extent of the object 620 (not shown) in a plane transverse to the reference axis 622, but also identify the wavelength content of the spectrum of light emanating from the object 620.

Figure 7:
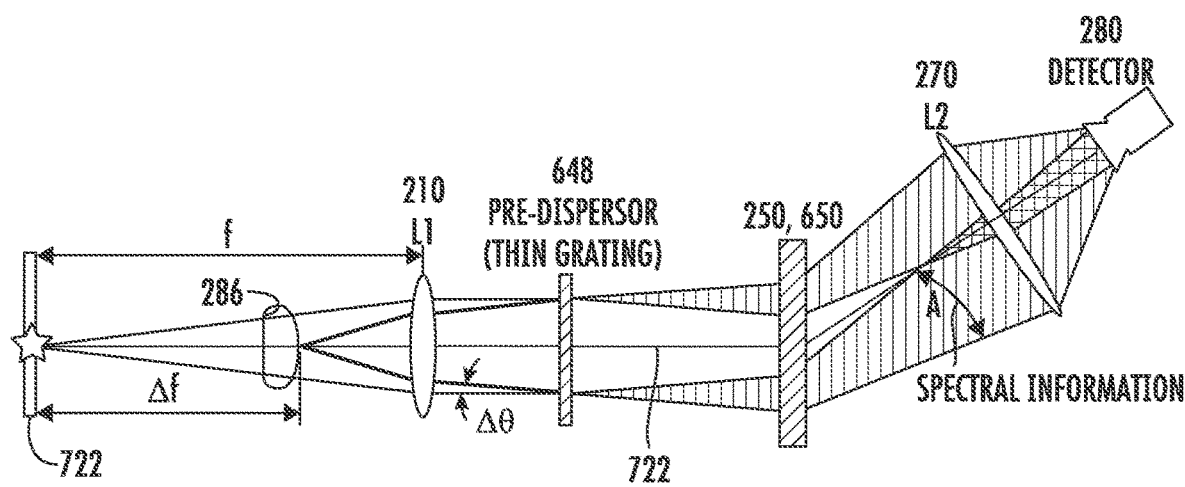
FIG. 7 is a schematic representation of an embodiment of the optical imaging system employing the device of FIG. 6, the optical path(s) of light through which are indicated for a portion (of the spatially-extended object) that is located on axis of the imaging system.

One specific configuration 700 of the optical system is illustrated in FIG. 7, in which the object 720 has substantial extent in a direction transverse to the optical axis 722 of the system, and the "star" represents a point of the spatially-extended object 720 located at the axis 722. The range of angles A, within which light is diffracted in transmission through the main diffractive filter 650 towards the lens element 270 contains light at the wavelengths representing spectral content of the object 722. While the pre-dispersor and the main hologram are shown in FIG. 7 to be separated from one another by a substantially non-zero distance, in a related embodiment these two optical diffractive filters may be positioned to form a stack of holograms, in which a surface of one hologram is in physical contact with a surface of the other.

Figure 8:
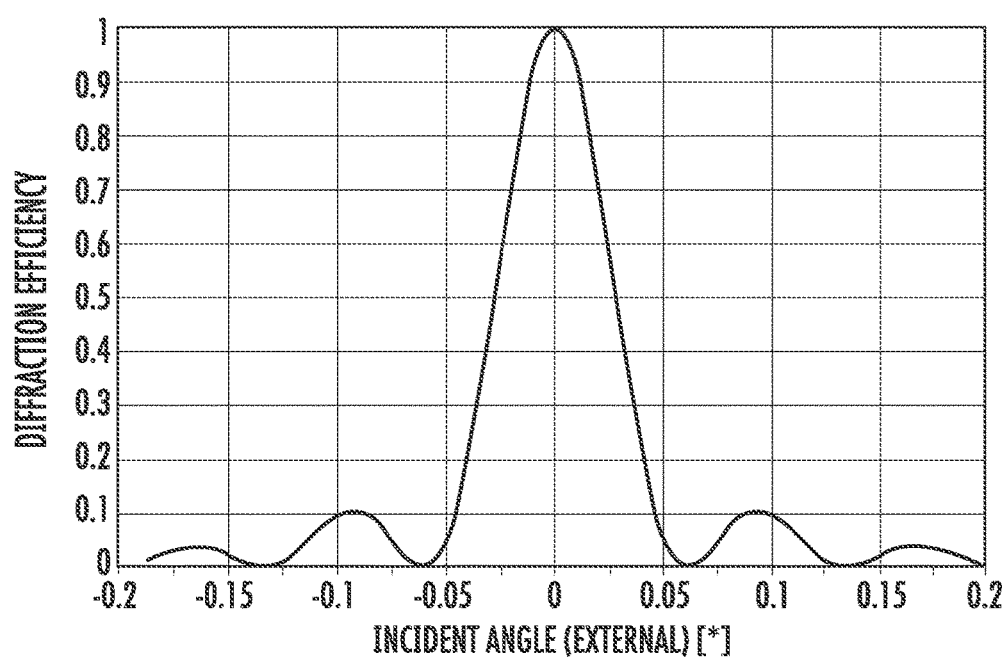
FIG. 8 is a plot representing angular selectivity of a 2 mm thick volume hologram grating.
Figure 9:
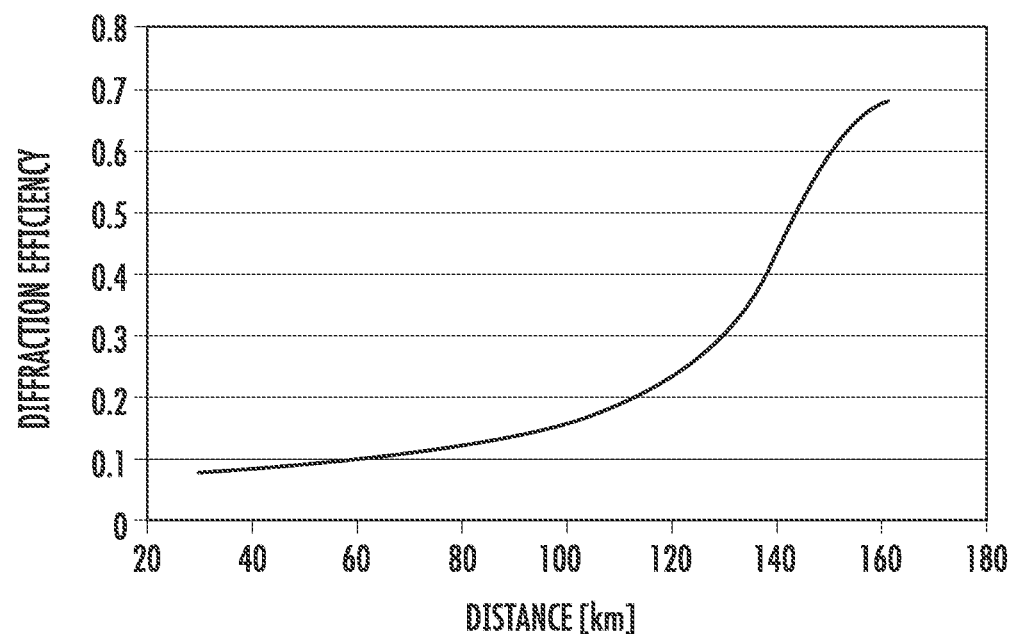
FIG. 9 is a plot showing diffraction efficiency of the hologram as a function of distance from the point source generating light incident onto the hologram.
Figure 10:
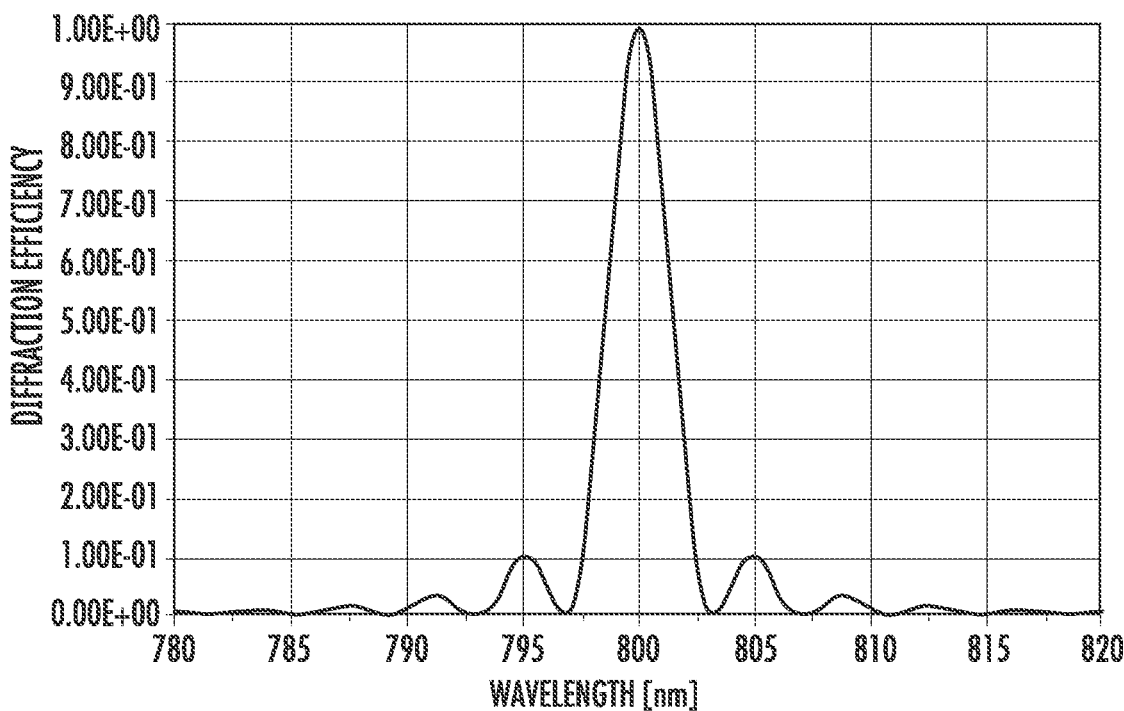
FIG. 10 is a plot illustrating the spectral (wavelength) bandwidth of the 2-mm-thick volume hologram, determined under specific conditions of illumination.
Figure 11:
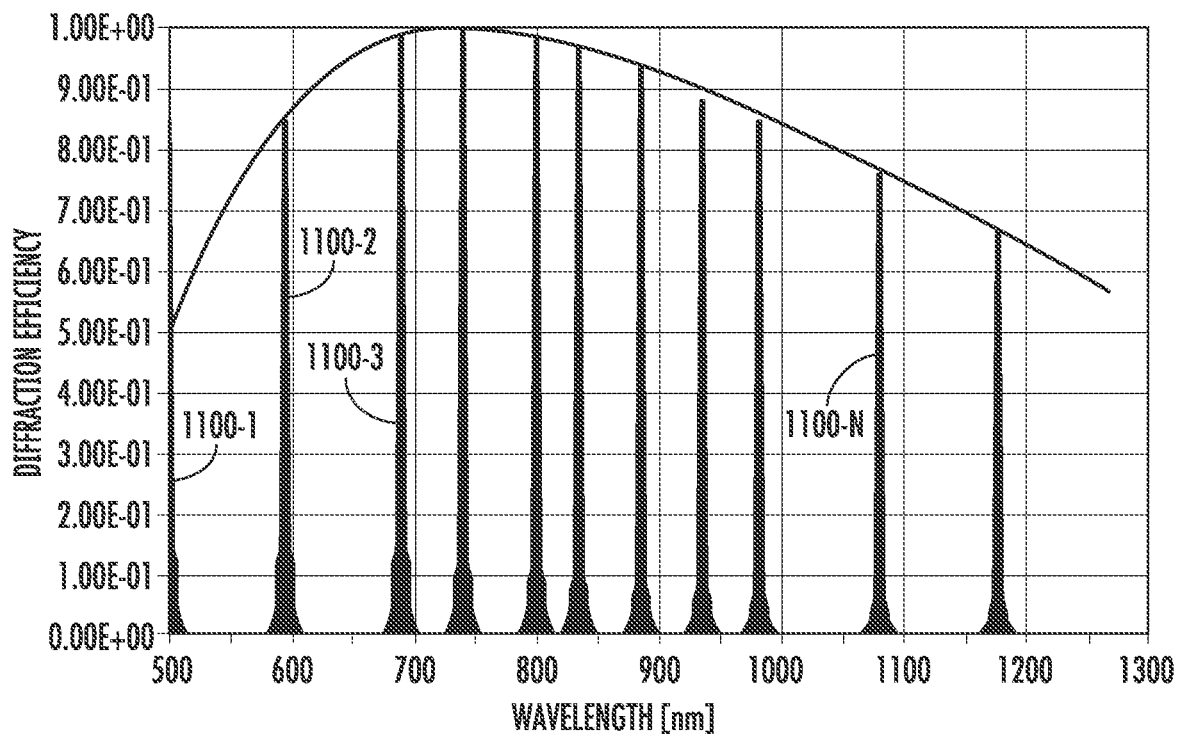
FIG. 11 contains plots of diffractive efficiency of a chosen VH illustrating that different portions of the transversely-extended object or target can be imaged, with the use of the imaging system of FIG. 2, at different wavelengths. As illustrated, the curve representing spectral selectivity of the VH shifts along the wavelength axis as a function of angle of incidence of light from the object or target onto the VH.

Operational advantages, provided by the use of the combination 600 of the pre-dispersor and the main hologram instead of a single volume hologram 250 in an optical imaging system will become particularly clear from the following example comparing the operation of the embodiment 200 with that of the embodiment 700:

Referring again to FIG. 2, in one specific implementation the volume hologram 250 is configured to have a thickness T of about 2 mm and is characterized by a pass-band at a central wavelength of about 800 nm, index of refraction of material of the hologram of n=1.5, the index modulation parameter of $\Delta n=0.00019$, the spatial frequency of the diffraction grating of 634 lp/mm, and the internal slant angle (that is the angle at which the Bragg planes are oriented with respect to the surface plane of the VH) of 80.26 degrees. If the nominal angle of incidence of light onto the hologram 250 is chosen to be 0° and angle of diffraction is chosen to be 30°, the angular selectivity of the hologram 250—that is, the angle of acceptance of the hologram defined as the maximum angle of incidence of light, within the main peak of the blaze curve, at which the hologram is configured to diffract the incident light—can be assessed to be about 0.05° FWHM (the blazing curve of such specifically configured hologram is shown in FIG. 8). When combined with a telescoping imaging system (L1 and L2) possessing a 1/1000 magnification, in a configuration of FIG. 2, such angular selectivity may be sufficient to discriminate between objects located—at the axis of the telescope—at distances the ratio of which is about 1/5 (e.g. a target object at about 150 km above the ground and a portion of the atmosphere scattering the sunlight at about 30 km above the ground, see FIG. 9). In this specific case, the wavelength pass-bandwidth of the volume hologram 250 is only 2.5 nm (see FIG. 10). In order to distinguish—from the background—any portion of the object that extends transversely with respect to the optical axis of the system 200, the system 200 has to be rotated or tilted with respect to the axis. At each instantaneous angular position with respect to the axis of the system, the system 200 can transmit, to the detector 280, light at a wavelength transmitted through the pass-band of the diffractive optical filter defined by the main hologram 250 at the corresponding angle of incidence of light onto the main hologram. Examples of such incident-angle-dependent pass-bands of the diffraction curve of the main hologram 250 are the curves 1100-1, 1100-2, ... , 1100-N of FIG. 11. (It is recognized that rotating either the incident beam or the VH 250 is not necessarily a practical solution.)

It is appreciated that, due to the required substantial thickness (of a few mm) of the VH 250, the material from which the VH 250 is fabricated is not likely to be any holographic recording material. Rather, the choice of materials is substantially limited to sensitized PMMA such as Phenanthrenequinone (PQ) doped poly(methyl methacrylate) (PMMA)), or photo-thermo-refractive glass material.

Figure 12:
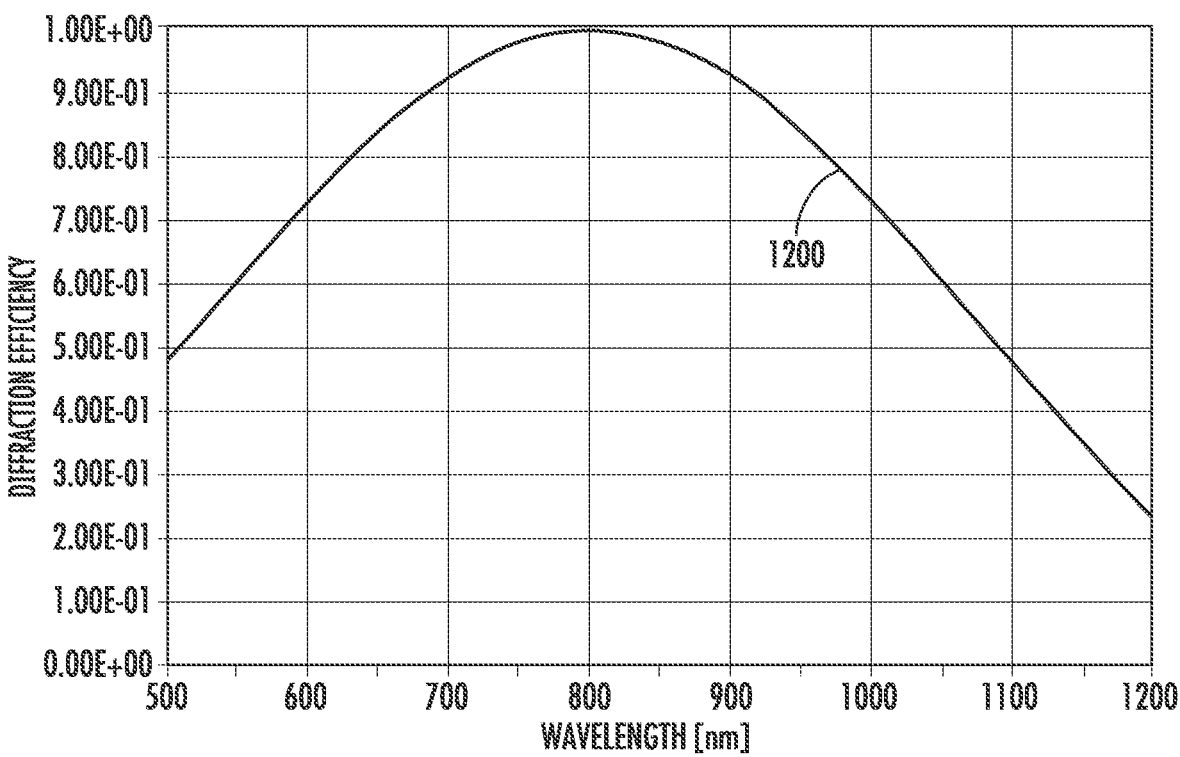
FIG. 12 is a plot representing a spectral dispersion characteristic of a 10-micron-thick pre-dispersor (also referred to as a PD or as an auxiliary hologram).

In advantageous contradistinction to the above-discussed situation, the addition of a pre-dispersor in front of the main hologram 250, 650 (as illustrated in FIGS. 6 and 7) amounts to changing the angle of incidence of light from the object prior to the arrival of such light to the main VH 250,650 so that the light impinges at the main VH 250,650 at the predetermined wavelength-dependent angle. To achieve this effect, the grating frequency of both the main hologram 250,650 and the pre-dispersor is chosen to be the same (in this example, 634 lp/mm). Since the pre-dispersor 648 does not need to be angularly selective itself, the thickness t of the pre-dispersor can be much smaller than that of the main hologram 250, 650 (e.g., t=10 micron) so the pre-dispersor is characterized by a wavelength bandwidth that is substantially wider than that of the VH (see curve 1200 of FIG. 12, in comparison with any of the curves 1100-1, ... 1100-N of FIG. 11). An example of pre-dispersor parameters includes: thickness t of about 10 μm, central wavelength of the pass-band of about 800 nm, refractive index of material of 1.5, the index modulation of 0.137, the nominal angle of incident of 0°, the angle of diffraction (corresponding to the nominal angle of incidence) of 30°, the grating frequency of 634 lp/mm, the internal slant angle of 80.26 degrees. Depending on a particular implementation, the ratio of the angles of acceptance (measured at FWHM of the corresponding blazing curves) of the main hologram and the pre-dispersor is preferably at least 5, more preferably at least 10, even more preferably at least 100, and most preferably at least 1,000.

The small thickness of the pre-dispersor component 648 allows the pre-dispersor to be fabricated from a variety of holographic recording materials such as, for example, dichromated gelatin, silver halide, or photopolymer such as Bayfol HX 200 from Covestro (allowing a film deposition of several microns and up to at least 16 microns as of date).

Referring again to the example of the selective, preferential imaging of the object (at about 150 km above the ground) on the background of the atmosphere, mentioned above, the skilled artisan will appreciate the advantageous contribution of the use of the embodiment of the invention—in particular, the use of the VH 250, 650 whether with or without the use of a pre-dispersor—for increase of the signal-to-noise ratio (CNR) in the case of monochromatic imaging. Here, in one practical implementation, the unwanted optical signal (which can be considered to the noise) arriving from the atmospheric layer of less than about 30 km from the ground is attenuated by a factor of −22 dB, while the sought after signal from the object at about 150 km above the ground is attenuated by about −3.3 dB. Accordingly, the increase in the signal-to-noise ratio (SNR) caused by the use of the invention is by a factor of about 18.7 dB. (The presence of the pre-dispersor will become advantageous when considering the polychromatic signal and/or noise, and the specific range(s) of increase of the SNR when the combination of the pre-dispersor and the main hologram is used with the telescopic system becomes dependent on the frequency spectrum of the signal and/or noise.)

The multiplicity of FIGS. 13A through 13E, 14A through 14E, 15A through 15E, and 16A through 16E illustrate some calculated characteristics of performance of related embodiments of the invention (specifically, the embodiments of FIG. 2 and FIG. 7, in which the 3.5 meter optical telescopic system is used, and for 16 discrete wavelengths of light within the spectral regions from about 600 nm to about 900 nm). Here, FIGS. 13E, 14E, 15E, and 16E list certain parameters characterizing corresponding embodiments and their respective performance. In reference to FIGS. 13E, 14E, 15E, and 16E, the parameter listed as "thickness" represents the thickness of the main volume holographic filter (denoted as 250 or 650 in other Figures); the parameter listed as "angle" represents angle of incidence of light (that has arrived from the target object) onto the main volume holographic filter. Parameter $r_0$ represents the atmospheric coherence length, describing the strength of the turbulence in the atmosphere.

In the presence of atmospheric turbulence, and considering an actual target object to be a point source of light (the full-width-half-maximum angular field-of-view of which, from the point of the imaging system, is limited to $\lambda/D$, where D is the diameter of the clear aperture of the telescope), the long-exposure FWHM value of the angular field-of view is limited to $\lambda/r0$. (Such angular field-of-view value of the blurred target object is represented by the parameter $\sigma_{tilt}$ describing the solid angle subtended by the object as seen from the embodiment of the imaging system of the invention while a certain degree of "jitter/turbulence of the atmosphere is present.) Accordingly, the smaller the r0 value the more blurred the image of the target point object.

Specifically, for the configuration(s) corresponding to FIGS. 13A-13E, the thickness of the main hologram is 1 mm, the angle of incidence of light onto it is 5 degrees; the efficiency of diffraction of the system equipped only with the VH filter or main hologram (an embodiment similar to that of FIG. 2) is 38%, while the efficiency of diffraction of the system equipped with both the VH filter and the pre-dispersor is 65% (an embodiment similar to that of FIG. 7). The curve 1310 of FIG. 13A illustrates the diffraction efficiency as a function of distance between the telescopic imaging system and the target object for the case when only the main hologram filter is present. The images 1320, 1324, and 1328 of FIGS. 13B, 13C, and 13D, respectively, are respective images of the target object through the optical imaging system devoid of any holographic filter (the embodiment of FIG. 2 or of FIG. 7 without any holographic filter involved); through the optical imaging system equipped with only one holographic filter—the main hologram or VH (the embodiment of FIG. 2); and through the optical imaging system equipped with both the main hologram and the pre-dispersor (the embodiment of FIG. 7). A person of skill in the art will readily appreciate that—as a result of the certain non-zero degree of the atmospheric turbulence/non-uniformity present between the imaging system of the invention and the target point object in the sky, the target point object is perceived by the imaging system as a blurred spot that subtends—in this case—the solid angle of 2.3 micro-radian. The images of FIGS. 13B, 13C are polychromatic images, while the overall image obtained when the pre-dispersor is used (see FIG. 13D) is a combination of multiple images each of which corresponds to the image at a specific wavelength of the optical spectrum at which the target object emits light. (For the purposes of the simulation, a certain number of discrete wavelengths was chosen, as opposed to the generally continuous spectrum, for the simplicity of illustration. As a result of such choice, the overall image of FIG. 13D is a spatial concatenation/combination of a discrete number of images of the target point object spatially blurred due to the identified atmospheric non-uniformity obtained with the use of the embodiment of FIG. 7, with both the main volume hologram and the pre-dispersor used, at a multiplicity of wavelengths.)

For the configuration(s) corresponding to FIGS. 14A-14E, the thickness of the main hologram 250, 650 is 1 mm, the angle of incidence of light onto the main hologram 250, 650 is 10 degrees; the efficiency of diffraction of the system equipped only with the VH filter or main hologram (an embodiment similar to that of FIG. 2) is about 11%, while the efficiency of diffraction of the system equipped with both the VH filter and the pre-dispersor is about 36% (an embodiment similar to that of FIG. 7). The curve 1410 of FIG. 14A illustrates the diffraction efficiency as a function of distance between the telescopic imaging system and the target object for the case of only the main hologram 250 being used. The images 1420, 1424, and 1428 of FIGS. 14B, 14C, and 14D, respectively, are respective images of the target object through the optical imaging system devoid of any holographic filter (the embodiment of FIG. 2 or of FIG. 7 without any holographic filter involved); through the optical imaging system equipped with only one holographic filter—the main hologram or VH (the embodiment of FIG. 2); and through the optical imaging system equipped with both the main hologram and the pre-dispersor (the embodiment of FIG. 7). A person of skill in the art will readily appreciate that—as a result of the certain non-zero degree of the atmospheric turbulence/non-uniformity present between the imaging system of the invention and the target point object in the sky, the target point object is perceived by the imaging system as a blurred spot that subtends—in this case—the solid angle of 2.3 micro-radian. The images of FIGS. 14B, 14C are polychromatic images, while the overall image obtained when the pre-dispersor is used (see FIG. 14D) is a combination of multiple images each of which corresponds to the image at a specific wavelength of the optical spectrum at which the target object emits light. (For the purposes of the simulation, a certain number of discrete wavelengths was chosen, as opposed to the generally continuous spectrum, for the simplicity of illustration. As a result of such choice, the overall image of FIG. 14D is a spatial concatenation/combination of a discrete number of images of the target point object spatially blurred due to the identified atmospheric non-uniformity obtained with the use of the embodiment of FIG. 7, with both the main volume hologram and the pre-dispersor used, at a multiplicity of wavelengths.)

For the configuration(s) corresponding to FIGS. 15A-15E the thickness of the main volume hologram 250, 650 is 1 mm, the angle of incidence of light onto the main hologram 250, 650 is 10 degrees; the efficiency of diffraction of the system equipped only with the VH filter or main hologram (an embodiment similar to that of FIG. 2) is about 11%, while the efficiency of diffraction of the system equipped with both the VH filter and the pre-dispersor is about 50% (an embodiment similar to that of FIG. 7). The curve 1510 of FIG. 15A illustrates the diffraction efficiency as a function of distance between the telescopic imaging system and the target object for the case of only the main holographic filter 250 present. The images 1520, 1524, and 1528 of FIGS. 15B, 15C, and 15D, respectively, are respective images of the target object through the optical imaging system devoid of any holographic filter (the embodiment of FIG. 2 or of FIG. 7 without any holographic filter involved); through the optical imaging system equipped with only one holographic filter—the main hologram or VH (the embodiment of FIG. 2); and through the optical imaging system equipped with both the main hologram and the pre-dispersor (the embodiment of FIG. 7). A person of skill in the art will readily appreciate that—as a result of the certain non-zero degree of the atmospheric turbulance/non-uniformity present between the imaging system of the invention and the target point object in the sky, the target point object is perceived by the imaging system as a blurred spot that subtends—in this case—the solid angle of 23 nano-radian. The images of FIGS. 15B, 15C are polychromatic images, while the overall image obtained when the pre-dispersor is used (see FIG. 15D) is a combination of multiple images each of which corresponds to the image at a specific wavelength of the optical spectrum at which the target object emits light. (For the purposes of the simulation, a certain number of discrete wavelengths was chosen, as opposed to the generally continuous spectrum, for the simplicity of illustration. As a result of such choice, the overall image of FIG. 15D is a spatial concatenation/combination of a discrete number of images of the target point object spatially blurred due to the identified atmospheric non-uniformity obtained with the use of the embodiment of FIG. 7, with both the main volume hologram and the pre-dispersor used, at a multiplicity of wavelengths.)

The illustration provided by FIGS. 16A-16E represents the idealized case, in which there is no disturbance/jitter in the atmosphere (and/or associated and inconsistencies of spatial distribution of refractive index) between the optical system of the embodiment and the target object. Here, the thickness of the main volume holographic filter 250, 650 is 1 mm, the angle of incidence of light onto this filter is 10 degrees; the efficiency of diffraction of the system equipped only with the VH filter or main hologram (an embodiment similar to that of FIG. 3) is about 11%, while the efficiency of diffraction of the system equipped with both the VH filter and the pre-dispersor is about 97% (an embodiment similar to that of FIG. 7). The curve 1610 of FIG. 16A illustrates the diffraction efficiency as a function of distance between the telescopic imaging system and the target object for the case of only main volume hologram 250 present in the imaging system. The images 1620, 1624, and 1628 of FIGS. 16B, 16C, and 16D, respectively, are respective images of the target object through the optical imaging system devoid of any holographic filter (the embodiment of FIG. 2 or of FIG. 7 without any holographic filter involved); through the optical imaging system equipped with only one holographic filter—the main hologram or VH (the embodiment of FIG. 2); and through the optical imaging system equipped with both the main hologram and the pre-dispersor (the embodiment of FIG. 7). A person of skill in the art will readily appreciate that—as a result of no atmospheric turbulance/non-uniformity present between the imaging system of the invention and the target point object in the sky, the target point object is perceived by the imaging system as point source of light, seen in each of FIGS. 16B, 16C, and 16D. The images of FIGS. 16B, 16C are polychromatic images, while the overall image obtained when the pre-dispersor is used (see FIG. 16D) is a combination of multiple images each of which corresponds to the image at a specific wavelength of the optical spectrum at which the target point object emits light. (For the purposes of the simulation, a certain number of discrete wavelengths was chosen, as opposed to the generally continuous spectrum, for the simplicity of illustration. As a result of such choice, the overall image of FIG. 13D is a spatial concatenation/combination of a discrete number of point images of the target point object that is not spatially blurred and obtained with the use of the embodiment of FIG. 7, with both the main volume hologram and the pre-dispersor used, at a multiplicity of wavelengths.)

A skilled artisan readily appreciates that one of the applications of the proposed methodology includes the use of the judiciously-chosen combination of multiple (two or more) holographically-defined optical diffractive filters in the telescope system to advantageously discriminate objects, during imaging of such objects on the light-emitting background, as a function of distance and/or angle with a practical operational bandwidth. The telephoto lens system (or telescope), combined with the pre-dispersor, causes the difference in separation distances (between the object and the pre-dispersor and that between the area or volume of the background space and pre-dispersor) to be manifested as a wavefront-propagation angle that is substantially independent from wavelength light, and hence discriminated by the main volume hologram over a wide spectral bandwidth.

References made throughout this specification to "one embodiment," "an embodiment," "a related embodiment," or similar language mean that a particular feature, structure, or characteristic described in connection with the referred to "embodiment" is included in at least one embodiment of the present invention. Thus, appearances of these phrases and terms may, but do not necessarily, refer to the same implementation. It is to be understood that no portion of disclosure, taken on its own and in possible connection with a figure, is intended to provide a complete description of all features of the invention.

It is also to be understood that no single drawing is intended to support a complete description of all features of the invention. In other words, a given drawing is generally descriptive of only some, and generally not all, features of the invention. A given drawing and an associated portion of the disclosure containing a description referencing such drawing do not, generally, contain all elements of a particular view or all features that can be presented is this view, for purposes of simplifying the given drawing and discussion, and to direct the discussion to particular elements that are featured in this drawing. A skilled artisan will recognize that the invention may possibly be practiced without one or more of the specific features, elements, components, structures, details, or characteristics, or with the use of other methods, components, materials, and so forth. Therefore, although a particular detail of an embodiment of the invention may not be necessarily shown in each and every drawing describing such embodiment, the presence of this detail in the drawing may be implied unless the context of the description requires otherwise. In other instances, well known structures, details, materials, or operations may be not shown in a given drawing or described in detail to avoid obscuring aspects of an embodiment of the invention that are being discussed.

The invention as recited in claims appended to this disclosure is intended to be assessed in light of the disclosure as a whole, including features disclosed in prior art to which reference is made.

For the purposes of this disclosure and the appended claims, the use of the terms "substantially", "approximately", "about" and similar terms in reference to a descriptor of a value, element, property or characteristic at hand is intended to emphasize that the value, element, property, or characteristic referred to, while not necessarily being exactly as stated, would nevertheless be considered, for practical purposes, as stated by a person of skill in the art. These terms, as applied to a specified characteristic or quality descriptor means "mostly", "mainly", "considerably", "by and large", "essentially", "to great or significant extent", "largely but not necessarily wholly the same" such as to reasonably denote language of approximation and describe the specified characteristic or descriptor so that its scope would be understood by a person of ordinary skill in the art. In one specific case, the terms "approximately", "substantially", and "about", when used in reference to a numerical value, represent a range of plus or minus 20% with respect to the specified value, more preferably plus or minus 10%, even more preferably plus or minus 5%, most preferably plus or minus 2% with respect to the specified value. As a non-limiting example, two values being "substantially equal" to one another implies that the difference between the two values may be within the range of +/−20% of the value itself, preferably within the +/−10% range of the value itself, more preferably within the range of +/−5% of the value itself, and even more preferably within the range of +/−2% or less of the value itself The use of these terms in describing a chosen characteristic or concept neither implies nor provides any basis for indefiniteness and for adding a numerical limitation to the specified characteristic or descriptor. As understood by a skilled artisan, the practical deviation of the exact value or characteristic of such value, element, or property from that stated falls and may vary within a numerical range defined by an experimental measurement error that is typical when using a measurement method accepted in the art for such purposes.

While the invention is described through the above-described exemplary embodiments, it will be understood by those of ordinary skill in the art that modifications to, and variations of, the illustrated embodiments may be made without departing from the inventive concepts disclosed herein. Disclosed aspects, or portions of these aspects, may be combined in ways not listed above. Accordingly, the invention should not be viewed as being limited to the disclosed embodiment(s).

In one example of possible modification, for example, the index modulation parameter for a pre-dispersor is at least 0.001 and higher. Depending on the specific implementation, the optical system of the invention may include more than two holograms (at least two of which are configured to operate as a pre-dispersor and as a main hologram) and/or additional optical components—for example, conventional spectral filters (such as colored glasses) or additional or lens-substituting wavefront-correcting optics (for example, curved reflectors). It is also appreciated that, in a related embodiment, the combination of the pre-dispersor and the main hologram can be employed with an imaging system containing a relay element (such as, for example, a telescopic system of the embodiment 300). A person of skill in the art will readily appreciate that, at least in the case of selectively imaging an on-axis point of the target object on the background of light from a background spatial area or volume differing from the target object with the use of a telescopic imaging system containing a negative-lens element relay—whether with the use of a single VH 200 (such as in the embodiment 300, for example) or containing a combination 600 of the holographic elements—the image of the target object at the optical detector 280 is formed as a real object while light 284 emanating from the background spatial area/volume can form a virtual image in a plane completely different from the surface of the optical detector. (As is well known in optics, a virtual image is an image formed when the outgoing rays from a point on an object always diverge. The image appears to be located at the point of apparent divergence. Because the rays never really converge, a virtual image cannot be projected onto a screen. In geometrical approximation, a virtual image is located by tracing the real rays that emerge from an optical device backward to a perceived point of origin. In contrast, a real image is one that is formed when the outgoing rays from a point converge at a real location.)

Another possible modification may involve the use of programmable processor: some of the steps of the embodiments of the method of the invention can be effectuated with a programmable processor (operably cooperated with at least one piece of hardware of a given embodiment; not shown in Figures for simplicity of illustration). The processor, if present, is controlled by instructions stored in a tangible, non-transitory storage memory. The memory may be random access memory (RAM), read-only memory (ROM), flash memory or any other memory, or combination thereof, suitable for storing control software or other instructions and data. Some of the functions performed by the processor have been described with reference to flowcharts and/or block diagrams. Those skilled in the art should readily appreciate that functions, operations, decisions, etc. of all or a portion of each block, or a combination of blocks, of the flowcharts or block diagrams may be implemented as computer program instructions, software, hardware, firmware, or combinations thereof. Those skilled in the art should also readily appreciate that instructions or programs defining the functions of the present invention may be delivered to a processor in many forms, including, but not limited to, information permanently stored on non-writable storage media (e.g. read-only memory devices within a computer, such as ROM, or devices readable by a computer I/O attachment, such as CD-ROM or DVD disks), information alterably stored on writable storage media (e.g. floppy disks, removable flash memory and hard drives) or information conveyed to a computer through communication media, including wired or wireless computer networks. In addition, while the invention may be embodied in software, the functions necessary to implement the invention may optionally or alternatively be embodied in part or in whole using firmware and/or hardware components, such as combinatorial logic, Application Specific Integrated Circuits (ASICs), Field-Programmable Gate Arrays (FPGAs) or other hardware or some combination of hardware, software and/or firmware components.

What is claimed is:

1. An optical imaging system comprising:
a first optical diffractive element having a first spectral characteristic,
wherein the first spectral characteristic has a first portion representing a first diffraction efficiency of the first optical diffractive element as a function of wavelength of light for a chosen first angle of incidence of the light onto the first optical diffractive element, the first spectral characteristic having a first bandwidth,
a second optical diffractive element having a second spectral characteristic and disposed to receive a first light wavefront diffracted at the first optical diffractive element and to form second light wavefront as a result of diffraction of the first light wavefront at the second optical diffractive element,
wherein the second spectral characteristic has a second portion representing a second diffraction efficiency of the second optical diffractive optical element as a function of the wavelength of light for a chosen second angle of incidence of the first light wavefront onto the second optical diffractive element, the second spectral characteristic having a second bandwidth,
wherein the second bandwidth is narrower that the first bandwidth, and
an optical detector positioned to receive light from the second wavefront and produce an output signal representing distribution of irradiance of the second wavefront across the optical detector.

2. The optical imaging system according to claim 1, further comprising
a combination of at least a first optical element and a second optical element, each of the at least the first optical element and the second optical element dimensioned to change a degree of divergence of light incident thereon,
wherein the first optical element from the combination is disposed to transmit the light incident thereon towards the first optical diffractive element, and
wherein the second optical element from the combination is disposed to receive the second wavefront and to relay it to the optical detector.

3. The optical imaging system according to claim 2, wherein the combination of the at least the first optical element and the second optical element is configured as a telescope.

4. The optical imaging system according to claim 3, wherein the at least the first optical element and the second optical element are not disposed co-axially with one another.

5. The optical imaging system according to claim 1, wherein at least one of the first and second optical diffractive elements is configured as a holographic layer carrying a hologram therein.

6. The optical imaging system according to claim 1, wherein the first optical diffractive element is configured as a first holographic diffraction grating having a first thickness, wherein the second optical diffractive element is configured as a second holographic diffraction grating having a second thickness, and wherein the first thickness is smaller than the second thickness.

7. The optical imaging system according to claim 1, wherein the first optical diffractive element and the second optical diffractive element are separated from one another by a substantially zero distance.

8. The optical imaging system according to claim 1, wherein a ratio of the first bandwidth to the second bandwidth is at least 10.

9. The optical imaging system according to claim 1, wherein the second spectral characteristic further includes a third portion representing a third diffraction efficiency of the second optical diffractive optical element as a function of the wavelength of light for a chosen third angle of incidence of light onto the second optical diffractive element, the third portion having a third bandwidth,
wherein the third bandwidth is narrower that the first bandwidth.

10. The optical imaging system according to claim 9, wherein the first bandwidth is greater than a sum of i) the second bandwidth, ii) the third bandwidth, and iii) a spectral separation between a central wavelength of the second bandwidth and a central wavelength of the third bandwidth.

11. The optical imaging system according to claim 9, wherein an absolute value of a difference between the chosen second angle of incidence and the chosen third angle of incidence is a value within a range between zero degrees and twelve degrees.

12. The optical imaging system according to claim 1, wherein the first optical diffractive element contains a diffraction grating characterized by a first spatial frequency, the second optical diffractive element contains a diffraction grating characterized by a second spatial frequency, and wherein the first spatial frequency is substantially equal to the second spatial frequency.

13. The optical imaging system according to claim 1, wherein the first optical diffractive element includes a holographic layer containing a hologram with a refractive index modulation of at least 0.1.

* * * * *